United States Patent
Beachum et al.

(10) Patent No.: US 6,361,276 B1
(45) Date of Patent: Mar. 26, 2002

(54) METHOD AND APPARATUS FOR REMOVAL OF MOISTURE FROM ROTOR BLADES

(76) Inventors: Norman L. Beachum, 801 Schaper Rd., Foristell, MO (US) 63348; James R. Kern, 834 Franklin Dr., Ardmore, OK (US) 73401

( * ) Notice: Subject to any disclaimer, the term of this patent is extended or adjusted under 35 U.S.C. 154(b) by 0 days.

(21) Appl. No.: 09/534,913

(22) Filed: Mar. 23, 2000

(51) Int. Cl.$^7$ .......................... B64C 11/00; B64C 27/00
(52) U.S. Cl. ............................. 416/61; 416/1; 416/37; 416/39
(58) Field of Search .............................. 416/61, 39, 37, 416/1; 244/1 R

(56) References Cited

U.S. PATENT DOCUMENTS

| | | | |
|---|---|---|---|
| 465,975 A | 12/1891 | Howard | |
| 1,004,168 A | 9/1911 | Howard | |
| 1,197,097 A | 9/1916 | Banks | |
| 1,328,897 A | 1/1920 | Rice | |
| 3,430,357 A | 3/1969 | Perry | |
| 3,521,373 A | 7/1970 | Pagnozzi | |
| 3,744,144 A | 7/1973 | Weis | |
| 3,889,389 A * | 6/1975 | Serup | 34/412 |
| 4,233,752 A | 11/1980 | Kleinguenther | |
| 4,570,357 A | 2/1986 | Kuboyama | |
| 4,620,373 A | 11/1986 | Laskowski et al. | |
| 4,719,761 A * | 1/1988 | Cromer | 62/94 |
| 5,123,177 A | 6/1992 | Koetter et al. | |
| 5,226,244 A | 7/1993 | Carter et al. | |
| 5,526,583 A | 6/1996 | Hull et al. | |
| 5,775,003 A * | 7/1998 | Goodwin, III | 34/191 |
| 5,824,897 A * | 10/1998 | Beachum et al. | 73/456 |
| 6,056,241 A * | 5/2000 | Kasher | 244/145 |
| 6,109,872 A * | 8/2000 | McCausland | 416/39 |
| 6,141,888 A * | 11/2000 | Cammarata | 34/536 |

\* cited by examiner

Primary Examiner—Christopher Verdier
Assistant Examiner—Richard Woo
(74) Attorney, Agent, or Firm—Blackwell Sanders Peper Martin LLP

(57) ABSTRACT

Composite rotor blades are constructed from a honeycombed polymer interior core structure having a bonded glass skin covering associated with the top and bottom surfaces thereof. Over time, environmental conditions lead to cracks or fissures in the glass skin coverings allowing moisture to accumulate in the interior honeycomb core of the blade. The present apparatus and method removes this accumulated moisture from composite rotor blades as well as from other objects constructed of polymer composite materials in general and includes an atmospherically sealed container of sufficient size to house the rotor blades or other objects within the container. The apparatus includes support fixturing for holding the rotor blades or other objects suspended within the container, a dehumidifier to reduce the moisture level of the air cycled through the container, a heater to control the temperature within the container, and a vacuum mechanism for controlling the pressure inside the container. By exposing the rotor blades or other objects to heated dry air and controlling the interior temperature and pressure of the container, the rotor blades or other objects are efficiently and economically purged of the accumulated moisture without invasive cutting of the blade or other object surfaces. Cyclical heating and cooling of the container as well as cycling the internal pressure of the container between atmospheric pressure and a pressure below atmospheric pressure will speed up the moisture removing process and compress the overall time involved.

33 Claims, 2 Drawing Sheets

METHOD AND APPARATUS FOR REMOVAL OF MOISTURE FROM ROTOR BLADES

FIELD OF THE INVENTION

The present invention relates generally to an apparatus and method for removing moisture from composite materials and, more particularly, to an apparatus and method for removing moisture from the interior of composite helicopter rotor blades. Natural environmental changes allow composite rotor blade structures to absorb and hold moisture. The present apparatus and method will quickly and economically reverse the natural environmental cycle and remove the moisture trapped within the blades. The present apparatus and method can also be utilized in the field.

BACKGROUND OF THE INVENTION

First generation helicopter blades were constructed of wood and fabric. Unfortunately, over time, wooden blades deteriorated due to dry rot, moisture absorption which caused swelling of the blades, and such blades generally suffered from all of the typical environmental effects common to wood products. Second generation rotor blades were manufactured from aluminum. These blades also suffered from environmental effects, namely, corrosion as well as the fact that they were intolerant to damage and even small anomalies located in a critical structural area could quickly fatigue the blade leading to potentially catastrophic results.

Composite rotor blades were developed during the 1970s to overcome problems inherent in the use of metal blades. Today, military helicopters utilize nearly exclusively composite rotor blades because of their tolerance to combat damage and resistance to in-flight structural failure. Composite blades are structurally redundant and can take tremendous structural damage without catastrophic failure. These blades are also easily repaired in the field. Typical composite blades utilize a Nomex honeycomb core with bonded glass skins forming the aft fairing portion of the blade. The Nomex core is oriented with the open lines of the cells bonded to the top and bottom glass skins. For example, the fiberglass rotor blades of a Boeing CH-47D helicopter are composite glass structures. The D shaped spar of such blades is a glass lay-up with a titanium erosion strip. The aft fairing is a Nomex honeycomb and glass skinned structure. These rotor blades are painted with a conductive "static" coating and finished with a lacquer. Improved coatings include the use of polyurethane in place of lacquer due to improved flexibility and moisture sealing capability.

Overtime, the glass skins associated with composite rotor blades are likewise subjected to the effects of the environment and to hard usage. With time, the ultra-violet effects of the sun, erosion, poor repairs and repeated high cyclical loading attack the epoxy glass matrix causing minute openings in the skins. In addition, installed blades on helicopters are normally tied down in an outdoor environment with the top skins of the blades under constant tension. In this situation, weakened areas associated with the top skin of the blades can open up during tie down allowing moisture to enter. Still further, a rotor blade sitting outside in the sun can easily reach 180° F. When heated, the air inside the Nomex honeycomb core expands and leaks out through any fissures in the skin. Upon cooling, the pressure with in the honeycomb core will decrease, and the air will be pulled back into the blade, along with any moisture present on the surface of the blade, including rainwater, condensation or humid air. Water is therefore accumulated within the blades over long periods of time, usually in small quantities through each cycle. The accumulation is worst in moist tropical climates. Significant quantities of water can be accumulated and stored in the core cavities of the blade in this manner.

Over time, this moisture upsets the track and balance of the blades and becomes an operational problem. When blades with water become too heavy to be balanced, they are currently sent to an overhaul depot where x-ray equipment is used to locate the moisture. Locally cutting the blade skin, routing out the affected core section and replacing the damaged area with a core plug and skin patch is the usual repair. Unfortunately, x-ray methodology is expensive and time consuming, and requires a highly skilled technician. Accurate mapping of the x-ray film to the blade as well as managing adequate x-ray coverage is important. Continuous x-ray equipment similar to the equipment used in airport security stations mitigates some of these problems but the expense of such equipment is usually prohibitive and precludes all but the major depots from accomplishing the necessary water removal and repairs.

Finally, when x-ray methods do, in fact, reveal water accumulation over a high percentage of the blade area, drilling of individual cells and coring becomes cost prohibitive and the blade is normally scrapped. A replacement blade for a typical military helicopter typically costs in the neighborhood of between $85,000 and $105,000.

It is therefore an object of the present invention to provide an economical method and apparatus to locate the moisture present in a particular rotor blade, to remove the moisture present in the rotor blade, and thereafter to accomplish any further repairs as necessary.

Another object of the present invention is to provide a method and apparatus which remove moisture from rotor blades non-invasively, resulting in lighter, superior blades.

Another object of the present invention is to provide a method and apparatus for removing moisture from rotor blades which can be utilized in the field within an acceptable period of time.

Another object of the present invention is to provide a method and apparatus which will more easily identify the location of the fissures and damage in the skin of the blade in preparation for repair.

Still another object of the present invention is to provide a method and apparatus for removing moisture from rotor blades which can be operated by technicians with minimal training.

SUMMARY OF THE INVENTION

To accomplish the foregoing and other objets of the present invention there is provided the following method and apparatus.

An atmospherically sealed container or "box" is provided. The present box or container is built large enough to completely house the damaged blade or blades. Blades are set on racks or other support fixtures that hold the blades in an inverted position relative to the blades' actual position when installed on the helicopter. The present support mechanism supports the blades by their opposite ends only as to allow the blades to bow slightly in the middle. This puts the top skin on each blade, which is facing down in the present box, in tension just as it was when installed on the helicopter. In this position, gravity works to pull water to the inner surface of the top skin. This positioning also tends to open any breaks or fissures present in the top skin.

A dehumidifier is installed in one end of the box. The dehumidifier has its dry air discharge piped to the other end of the box. The dry air then blows lengthwise over the blades back to the air inlet of the dehumidifier. Any moisture collected in this air as it travels across the length of the blades due to moisture being released from the interior of the blades is captured at an air intake to the dehumidifier and thereafter discharged to the outside of the sealed box. New dehumidified air is then again discharged at the opposite end of the present box and another cycle is initiated.

In order to speed up the drying process, heating the box and/or decreasing the pressure within the box can be used to reduce the overall time necessary to remove sufficient amounts of moisture from the blades. In this regard, cyclical heating and cooling of the box may more nearly reverse the natural process that allowed water to enter the blades in the first place, the heated air within the Nomex core expanding and tending to expel moisture trapped near the downside of the blades. In similar fashion, cycling the pressure within the box between atmospheric pressure and a pressure below atmospheric pressure will cause a pumping action to take place which will also tend to expel moisture from the downside of the blades.

As moisture exits the blade, talcum from the honeycomb core is washed to the surface clearly indicating and identifying the location of fissures through which the moisture entered/exited the blade. This gives a clear indication of where repairs are required. Proper sealing of the water entry points and repainting of the newly prepared surface will result in a water free blade that will resist moisture entry for a reasonable period of operational time. The present method and apparatus will therefore allow so called "water blades" to be repaired in the field.

BRIEF DESCRIPTION OF THE DRAWINGS

For a better understanding of the present invention, reference may be made to the accompanying drawings in which.

DETAILED DESCRIPTION OF THE INVENTION

Figure 1:
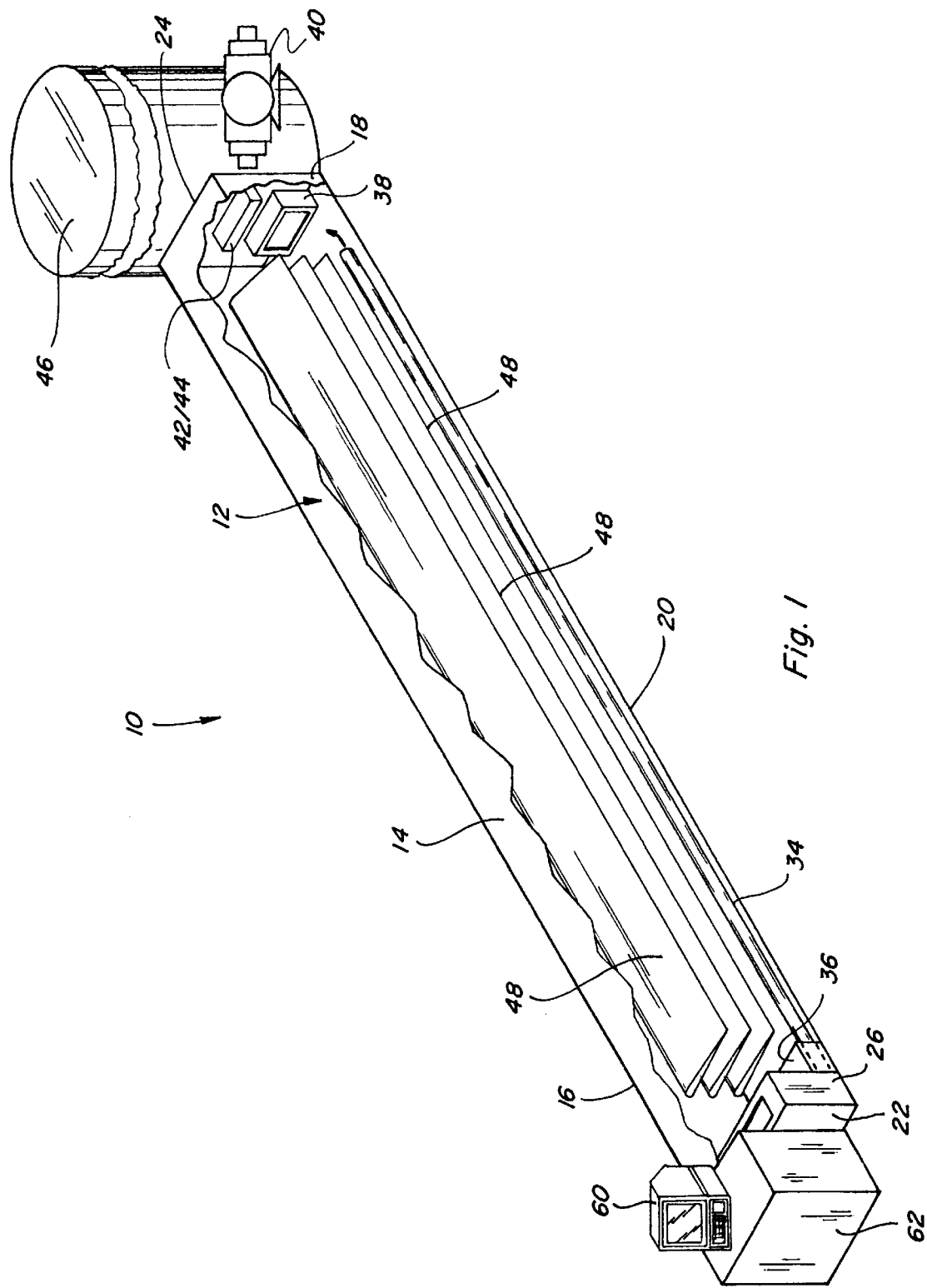
FIG. 1 is a perspective view of the moisture removal apparatus constructed in accordance with the teachings of the present invention, the top and side portions of the present apparatus being illustrated in a cut away view to more clearly illustrate the present invention.

Referring to the drawings more particularly by reference numbers wherein like numerals refer to like parts, number 10 in FIG. 1 identifies a preferred embodiment of the present moisture removal apparatus which includes an elongated box 12 having a removable cover portion 14, opposed sides 16 and 18, base 20, and end panels 22 and 24. The box 12 is atmospherically sealed and preferably insulated and further includes a dehumidifier 26 located adjacent end panel 22, a pair of resistance heating sources 36 and 38 located near the respective end panels 22 and 24, and a vacuum pump 40 with associated air tank 46 located exterior to end panel 24. The apparatus 10 is shown with three rotor blades 48 positioned therewithin for drying. The blades 48 have a top blade surface 50 and a bottom blade surface 52, which surfaces are identified relative to the blades' positions when installed on a helicopter. The blades 48 are loaded in the box 12 in an inverted position with their top surface 50 facing down towards the base 20. A computer 60 is coupled to various components within the box 12 in a conventional manner for use in controlling the operation of such components and for gathering data as will be hereinafter explained.

Figure 2:
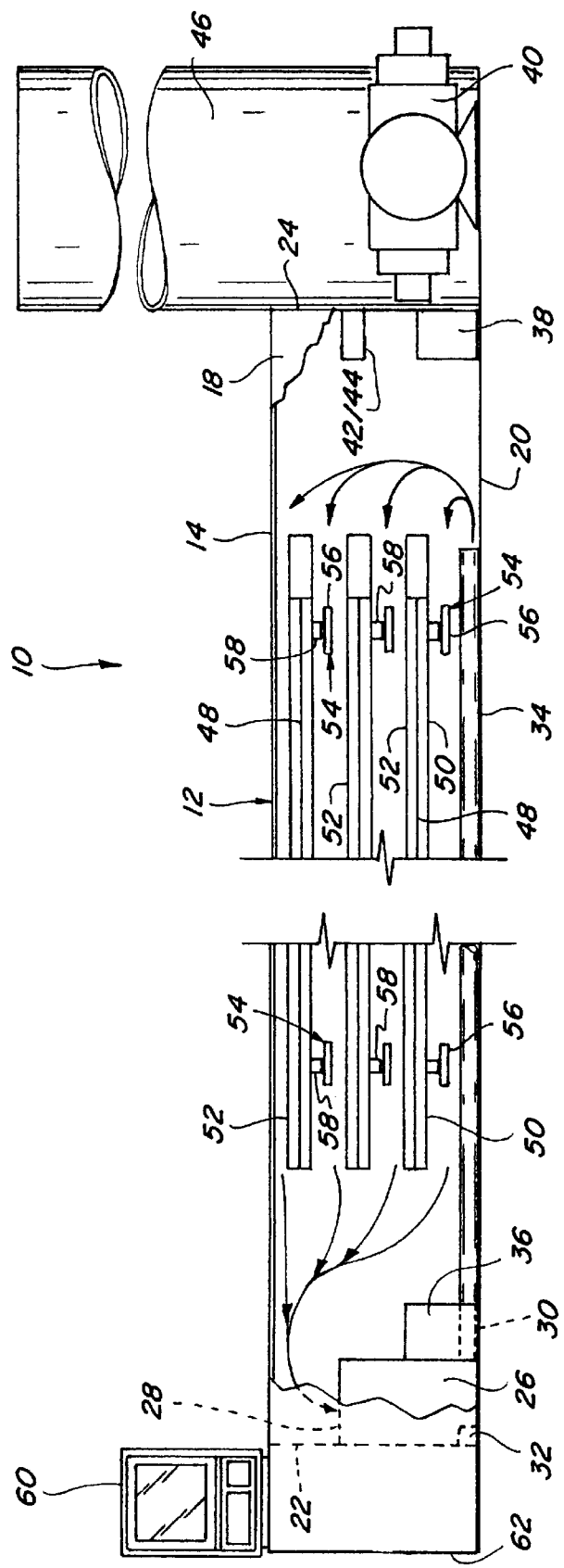
FIG. 2 is a cross sectional view of the moisture removal apparatus illustrated in FIG. 1.

As illustrated in FIG. 2, the dehumidifier 26 includes an air inlet port 28 which communicates with air inside the box 12, an air exhaust port 30, and a condensation discharge port 32 through which the condensation collected by the dehumidifier 26 is discharged from the box 12. Attached to the exhaust port 30 is approximate tubing or piping 34 which directs or routes the air being exhausted into the box to the opposite side of box 12 near end panel 24. The exhausted dry air then flows along the blade surfaces 50 and 52 and is again captured by the air inlet port 28. The vacuum pump 40 is connected to box 12 through intake 42 and exhaust 44.

The blades 48 are supported within the box 12 by a plurality of racks 54, each rack 54 including a pair of projecting shelves 56 as best illustrated in FIG. 2. The shelves 56 support the blades 48 at their respective end portions thereby allowing the blades 48 to bow slightly downwardly at the center as illustrated. This position mimics the position of the blades 48 when actually installed on a helicopter, and as when the fissures opened up and the moisture was ingested into the blade. By installing the blades 48 as just described in box 12, the bowing of such blades puts the top skin surface 50 in tension allowing any fissures to migrate open. This is exactly the reverse position of the blades when moisture entered the fissures. In this position, gravity works to force any moisture to migrate downward towards the top surfaces 50 of each blade 48. With the top surface 50 in tension, any leaks or fissures in the top skin 50 will tend to open up and allow such moisture to exit therethrough. As this moisture exits the blades 48, it is captured by the dry air flowing across the blades and such moisture laden air is then recaptured by dehumidifier 26 and expelled exterior of the box 12 through discharge port 32 as previously explained.

Each shelf 56 further includes one or more load sensors 58 as best illustrated in FIG. 2. The load sensors 58 allow the blades to be weighed during the drying process without removal from the box 12. The sensors 58 are coupled to computer 60, or to other equivalent controller or processing means, in a conventional manner. In this regard, weight measurements can be taken periodically, or at predetermined intervals, and the results of each reading can be stored and compared relative to each other to establish the amount of water removed from each blade 48 between each successive reading. When weight loss between successive readings ceases or diminishes to a predetermined rate, the technician is alerted that the drying process is completed. As illustrated in FIGS. 1 and 2, computer 60 is shown sitting upon a computer stand or other fixture 62 which is positioned adjacent end panel 22 of box 12.

In a preferred embodiment, vacuum pump 40 is cycled on and off to enhance moisture removal. Lowing the pressure in box 12 helps to compress the overall time to remove moisture from the blades 48 due to the fact that by simply lowering the pressure in the box to below atmospheric pressure will cause any trapped moisture to migrate towards the downside of the blades in an effort to equalize the pressure. As the pressure decreases, the moisture in the blades 48 will migrate out of the blades at the points of fissure until the pressure inside the box does, in fact, equalize with the pressure inside the honeycomb core or cell. Once the pressures are equalized, water migration ceases. To reinstate this pressure aided migration, the partial vacuum or pressure reduction is removed and the pressure within the box 12 is again restored to atmospheric pressure or slightly below. The pressure in the box 12 and the blades 48 is then again lowered to below atmospheric pressure and the process is repeated. By cycling the pressure up and down, a cyclic pumping action is encouraged. It is preferable to complete as many pressure cycles per minute as possible with the preferred pressure differential being in the range of about 2 to 3 inches of mercury.

Similarly, the addition of heat speeds up the process of converting the liquid moisture in the blades 48 to a gaseous state for pick up by the dry air flowing thereacross and removal from the box 12 by the dehumidifier 26. The higher the temperature within the box 12, the faster the drying process.

Cycling of the temperature, as with pressure, will likewise reproduce the conditions which caused the moisture to be ingested in the first place and such cyclic thermal action may further enhance and facilitate moisture removal from the blades. For example, with the blades 48 positioned within the box 12 as previously discussed, gravity will have allowed any trapped moisture within the blades to migrate downward towards top surface 50 thereby leaving trapped air inside the core near the bottom space 52. As the blade skin is heated, the air in the Nomex core expands and tends to try to expel the moisture through the fissures located on blade surface 50. However, when just a small amount of moisture leaves the core cell, inner and outer cell pressures will tend to equalize effectively stopping the flow. At this point, allowing the box 12 to cool by shutting off the heat sources 36 and/or 38 or by otherwise removing heat from the box 12 will allow the pressures and temperatures to equalize. Once pressure equalization occurs, dehumidified air is allowed to migrate back through fissures or micro-cracks and another thermal cycle could then be initiated to remove additional moisture. The quicker the cycles, the quicker the moisture extraction. In some cases, thermal cycling may not be advantageous due to the time required to sufficiently cool down the box 12 between cycles. In these situations, maintaining a constant internal temperature within box 12 is preferred. In controlled testing of the present invention, a constant box temperature of 140° was generally preferred. The internal temperature of box 12 can be monitored and/or controlled through the use of one or more temperature sensors or other known means.

Regardless of which features of the present invention are utilized to remove moisture from the blades 48, as previously stated, the computer 60 can be programmed to review the overall weight loss of each blade 48 during processing. This programming can result in the load sensors 48 taking periodic readings to determine the incremental weight loss associated with each respective blade 48. When the weight loss reaches a predetermined level, the technician is alerted that the moisture removal process for that particular blade has been completed.

During the moisture removal process associated with various tests of the present invention, as moisture was expelled from the blade, it was noted that talcum from the Nomex honeycomb core was washed to the blade surface adjacent each moisture entry/exit point. The talcum powder substance provided a telltale sign of where repairs to the blade skin were needed. As a result, upon completion of the process and upon removal of the blades 48 from the box 12, each water entry/exit point associated with each blade 48 was identified and each water entry/exit point was repaired and properly sealed as is known in the art. Proper repainting of the newly prepared surfaces resulted in a water free blade that will resist moisture entry for a reasonable period of time.

In the following example, the moisture removing and drying process was accomplished in a box such as box 12 utilizing a dehumidifier such as dehumidifier 26 and a constant heat source such as heat sources 36 and/or 38.

EXAMPLE

A wooden box was fabricated to hold a single blade in a horizontal, inverted position. The blade was supported within the box at the ends of the blade thereby allowing the center of the blade to bow downward. The box was equipped with resistance heaters at each end. Thermostats were placed along the blade surface at about 5 foot intervals to monitor the blade temperature. Temperatures were held to a maximum of 120 degrees F.

A Munters Corp. (Cargo Caire Division) De-Humidifier (DEW-50) was installed inside the box near one end. The conditioned exhaust air was piped to the opposite end of the box where the air would then flow back over the blade to the dehumidifier inlet. Extracted moisture was drained outside the box.

A test rotor blade was supplied by the Hawaii National Guard. The test blade was unusable due to ingested water. The blade was visually inspected, weighed, and placed in the box in an inverted position. The data collected during the moisture removal process is set forth in the following Table 1.

TABLE 1

Green Tagged - Water Intrusion

Drying Process

| Date | Weight (Lbs) | Temp. (deg F.) | Delta Weight (Lbs) |
|---|---|---|---|
| Jan 26 | 356.78 | | |
| Feb 6 | 356.59 | 90 | −.19 |
| Feb 15 | 356.35 | 120 | −.24 |
| Feb 22 | 356.13 | 120 | −.22 |
| Mar 1 | 356.01 | 120 | −.12 |
| | | Total | −.77 |

Repair Process

| | Weight (Lbs) | Delta Weight (Lbs) |
|---|---|---|
| Stripped top of blade Blended bottom | 355.58 | −.43 |
| Painted blade | 356.0 | +.42 |
| | Total | −.01 |
| Cumulative weight change | | −.78 |

The right hand column of Table 1 illustrates the individual weight loss readings associated with the drying process resulting in a total water weight loss of 0.77 lbs. During repair of the blade, the top was stripped and repainted, resulting in an additional total weight loss of 0.01 lbs. The overall cumulative weight change from beginning to end resulted in a weight loss of 0.78 lbs.

When the blade was removed from the box, the moisture entry/exit points were evidenced by an extract from the blades. This extract was a white powdery substance believed to be a talcum like powder substance that the Nomex core material is normally shipped with. The deposits varied from ⅛ to ¼ inch in length, running parallel to the 45 degree glass bias. It is believed that the residue was washed through the fissures in the glass skin when the moisture was removed from the Nomex core.

The treated blade was flight tested at AAFS #3 in Peoria, Ill. The helicopter used for the flight test was tail number 10245.

TABLE 2

The blade was installed in the Forward Red position. The following Aircraft Vibration Analyzer (AVA) Test and corrections were made:

| | | |
|---|---|---|
| Ground Track | | No Corrections |
| Hover | | No Corrections |
| Flight 1 Data: | | 8:46:00 |

| State | FORLAT | FORVERT | AFTLAT | AFTVERT |
|---|---|---|---|---|
| Hover | 1.08 | .13 | .19 | .19 |
| 80K | 0.73 | .25 | .36 | .15 |
| 120K | 0.96 | .41 | .33 | .13 |
| 140K | 1.08 | .91 | .27 | .36 |

Corrections Made—8 Red P/C link &—7 Red Weights

These were the Aircraft Vibration Analyzer (AVA) recommended corrections for two adjustments.

| Flight 2 Data: | 11:46:00 | No Corrections Made | | |
|---|---|---|---|---|
| State | FORLAT | FORVERT | AFTLAT | AFTVERT |
| Hover | .15 | .17 | .06 | .06 |
| 80K | .22 | .25 | .27 | .19 |
| 120K | .30 | .14 | .29 | .15 |
| 140K | .33 | .33 | .23 | .07 |

The aircraft reacted exactly as was expected by the AVA predicted responses.

From the foregoing description, those skilled in the art will appreciate that all the objects of the present invention are realized. A blade drying apparatus and method which non-intrusively removes moisture trapped within rotor blades is provided. Further, the method and apparatus indicate where repairs are needed thereby producing a lighter, superior repaired blade. Finally, the blade drying box provided is much less expensive than traditional x-ray equipment and requires a much lower skill level to operate.

While a specific embodiment has been shown and described, many variations are possible. As noted above, the present box 12 can be designed to hold any number of blades and such box can be constructed from any suitable material. While a portable unit is presently preferred and desirable for use in the field, a more permanent construction may be likewise utilized.

Most importantly, the present method and apparatus for moisture removal is not limited for use solely with rotor blades. Other objects constructed of composite materials which likewise experience similar moisture retention problems may be treated in a like manner, with adjustments being made in size, shape and types of materials depending upon the particular application involved.

Thus, there has been shown and described several embodiments of a method and apparatus for removing moisture from helicopter rotor blades and other composite materials, which method and apparatus fulfill all of the objects and advantages sought therefore. As is evident from the foregoing description, certain aspects of the present invention are not limited by the particular details of the examples illustrated herein, and it is therefore contemplated that many changes, modifications, variations and other uses and applications of the present invention, including equivalents thereof, will become apparent to those skilled in the art after considering this specification and the accompanying drawings. All such changes, modifications, various and other uses and applications which do not depart from the spirit and scope of the invention are deemed to be covered by the invention which is limited only by the claims which follow.

What is claimed is:

1. An apparatus for removing moisture from an object made at least in part from a honeycomb core material having bonded composite layers associated therewith comprising:

an atmospherically sealed containment means of sufficient size to house the object;

support means located within said containment means for holding the object therewithin;

circulation means to cycle air through said containment means;

dehumidifier means to reduce the moisture level of the air cycled through said containment means; and heating means to heat the interior of said containment means.

2. The apparatus as defined in claim 1 wherein said containment means is a self-contained portable box.

3. The apparatus as defined in claim 1 wherein said circulation means is a dehumidifier exhaust fan.

4. The apparatus as defined in claim 1 wherein said dehumidifier means is a condensation type dehumidifier.

5. The apparatus as defined in claim 1 wherein said heating means further includes means to cycle the temperature within said containment means.

6. The apparatus as defined in claim 1 including vacuum means to reduce the pressure within the interior of said containment means.

7. The apparatus as defined in claim 6 wherein said vacuum means further includes means to cycle the pressure within said containment means.

8. An apparatus for removing moisture from composite rotor blades, each rotor blade having a center portion and opposed end portions, said apparatus comprising:

an atmospherically sealed containment means of sufficient size to house at least one rotor blade;

support means to hold at least one rotor blade suspended within said containment means, said support means supporting said at least one rotor blade in the vicinity of its opposed end portions so as to allow gravity to at least slightly bow the center portion thereof downwardly;

circulation means to cycle air through the containment means; and dehumidifier means to reduce the moisture level of the air cycled through the containment means.

9. The apparatus as defined in claim 8 including heating means to heat the interior of said containment means.

10. The apparatus as defined in claim 8 including vacuum means to reduce the pressure of the interior of said containment means.

11. The apparatus as defined in claim 8 wherein said containment means is a self-contained portable box.

12. The apparatus as defined in claim 8 wherein said circulation means is a dehumidifier exhaust fan.

13. The apparatus as defined in claim 9 wherein said heating means further includes means to cycle the temperature within said containment means.

14. The apparatus as defined in claim 10 wherein said vacuum means further includes means to cycle the pressure within said containment means.

15. An apparatus for removing moisture from at least one composite rotor blade, the rotor blade having a center portion and opposed end portions, said apparatus comprising:

an atmospherically sealed box of sufficient size to enclose the at least one rotor blade;

a support rack located within said box to suspend the at least one rotor blade therewithin, said support rack including projecting shelves to support the at least one rotor blade adjacent its opposed end portions; and a dehumidifier positioned within said box to remove moisture from the air located therein, said dehumidifier including an exhaust fan mechanism to cycle dry air throughout said sealed box.

16. The apparatus as defined in claim 15 further including a heating mechanism to control the temperature within said sealed box.

17. The apparatus as defined in claim 16 wherein said heating mechanism further includes a mechanism to cycle the temperature within said sealed box at predetermined intervals.

18. The apparatus as defined in claim 15 further including a vacuum mechanism to reduce the air pressure within said sealed box.

19. The apparatus as defined in claim 18 wherein said vacuum mechanism further includes a mechanism to cycle the pressure within said sealed box at predetermined intervals.

20. An apparatus for removing moisture from at least one composite rotor blade, the rotor blade having a center portion and two terminal end portions, said apparatus comprising:

an elongated self-contained portable atmospherically sealed box of sufficient size to house at least one rotor blade;

a rotor blade support rack having projections to support the at least one rotor blade adjacent its two terminal end prtions;

a condensation-type dehumidifier located within and at one end of said elongated box, said dehumidifier having an air intake port and a dry air exhaust port, said exhaust port being connected to conduit means for carrying the exhausted dry air to the opposite end of said elongated box whereby the dry air flows over the at least one rotor blade as it travels back to the air intake port of said dehumidifier;

a heating mechanism to control the internal temperature of said sealed box; and a vacuum mechanism to control the air pressure within said sealed box.

21. The apparatus as defined in claim 20 wherein said heating mechanism is capable of cycling the internal temperature within said sealed box between a first and a second predetermined temperature.

22. The apparatus as defined in claim 20 wherein said vacuum mechanism is capable of cycling the pressure within said sealed box between a first and a second predetermined pressure.

23. The apparatus as defined in claim 22 wherein said first pressure is substantially atmospheric pressure and said second pressure is a pressure below atmospheric pressure.

24. The apparatus as defined in claim 20 further including a load sensor associated with each of said support rack projections, said load sensors being operable to output a signal indicative of the weight of the at least one rotor blade without removing the rotor blade from said sealed box.

25. The apparatus as defined in claim 24 further including a computer system coupled to said load sensors for receiving signals therefrom, said computer system storing and displaying weight data outputted by said load sensors.

26. A method for removing moisture from at least one composite rotor blade, the rotor blade having a center portion and opposed end portions, said method comprising:

inverting the rotor blade relative to the position of the rotor blade when installed upon a helicopter;

enclosing the rotor blade within an atmospherically sealed container;

supporting the inverted blade adjacent its opposed end portions so that the blade is allowed to bow slightly at its center; and exposing the blade to dehumidified air until the desired amount of moisture is removed from the blade.

27. The method as defined in claim 26 including heating the interior of the sealed container to a predetermined temperature.

28. The method as defined in claim 26 including reducing the air pressure within the sealed container to a predetermined pressure.

29. The method as defined in claim 27 including cycling the temperature within the interior of the sealed container between first and second temperatures at predetermined intervals.

30. The method as defined in claim 28 including cycling the air pressure within the sealed container between first and second pressures at predetermined intervals.

31. The method as defined in claim 26 including weighing the rotor blade at predetermined intervals to determine the amount of water which has been removed from the blade.

32. A method for removing moisture from at least one composite rotor blade comprising:

inverting the rotor blade relative to the position of the rotor blade when installed upon a helicopter;

enclosing the rotor blade within an atmospherically sealed container;

supporting the inverted rotor blade at its terminal end portions;

positioning the terminal end portions of the rotor blade upon load sensors;

weighing the blade by means of said load sensors;

heating the interior of the container to a predetermined temperature, exposing the rotor blade to dehumidified air;

cycling the pressure in the sealed container by repeatedly creating and releasing a partial vacuum within the container;

reweighing the rotor blade at periodic intervals to determine the amount of water removed; and repeating the steps of exposing, cycling and reweighing until the desired amount of moisture is removed from the rotor blade.

33. The method as defined in claim 32 wherein the heating step further includes cycling the internal temperature of the container between first and second temperatures at predetermined internals.

* * * * *

UNITED STATES PATENT AND TRADEMARK OFFICE
CERTIFICATE OF CORRECTION

PATENT NO. : 6,361,276 B1  Page 1 of 1
DATED : March 26, 2002
INVENTOR(S) : Beachum et al.

It is certified that error appears in the above-identified patent and that said Letters Patent is hereby corrected as shown below:

<u>Column 8,</u>
Line 15, after "therewithin" insert --, said support means supporting said object in the vicinity of its opposed end portions --

Signed and Sealed this

Twenty-seventh Day of August, 2002

Attest:

Attesting Officer

JAMES E. ROGAN
*Director of the United States Patent and Trademark Office*